March 19, 1968  E. M. CONNELLY  3,374,469
MULTI-OUTPUT STATISTICAL SWITCH
Filed Aug. 30, 1965  2 Sheets-Sheet 1

INVENTOR
EDWARD M. CONNELLY
BY Hurvitz & Rose
ATTORNEYS

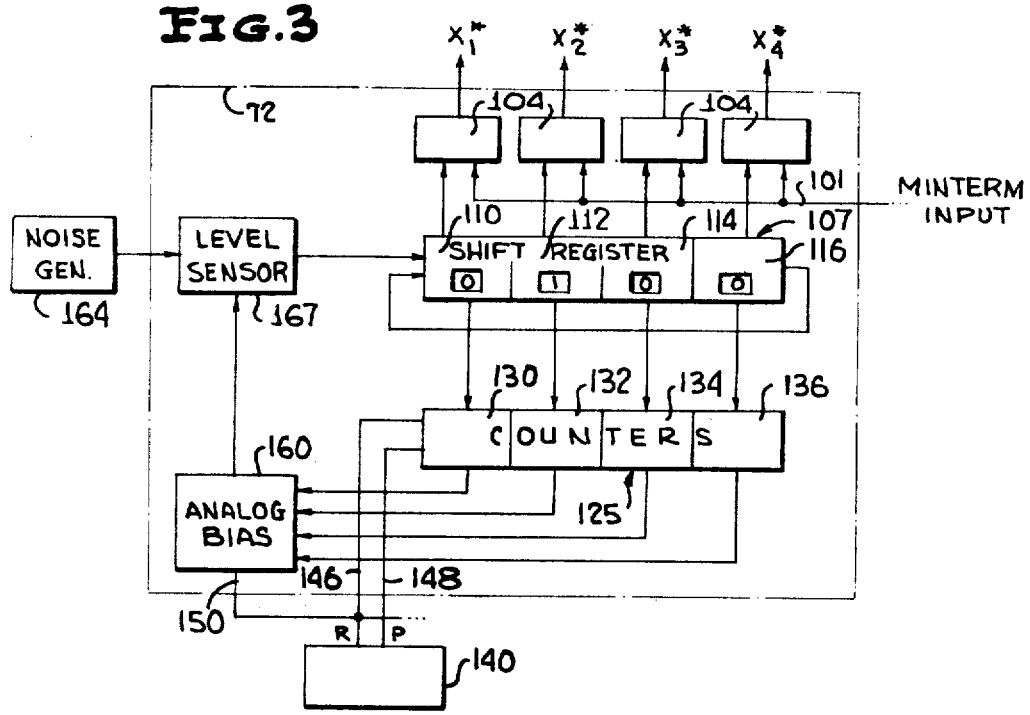
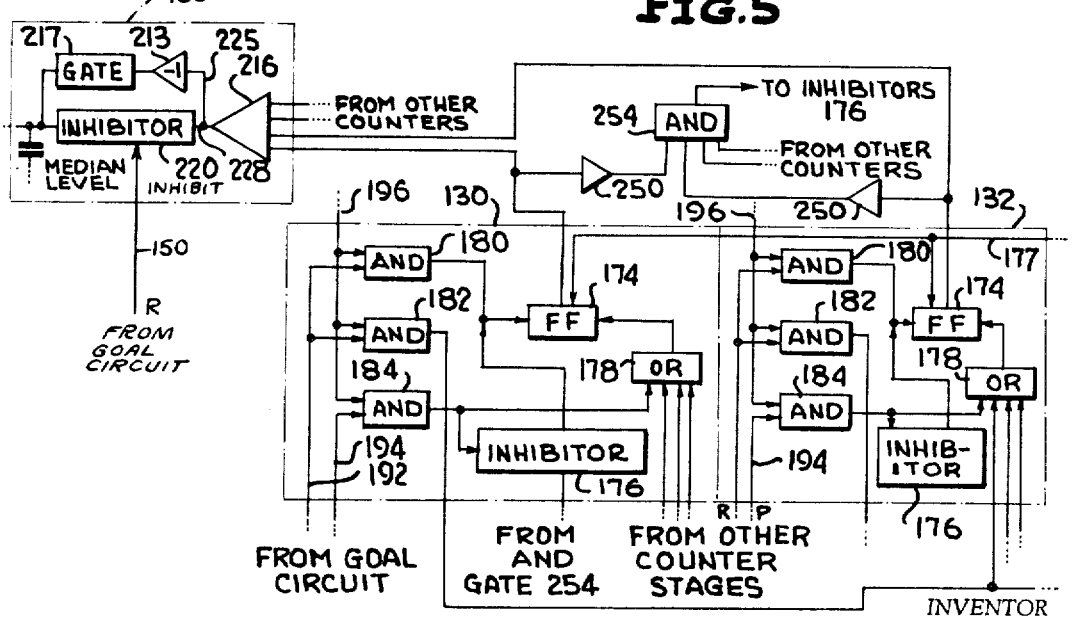

United States Patent Office 3,374,469
Patented Mar. 19, 1968

3,374,469
MULTI-OUTPUT STATISTICAL SWITCH
Edward M. Connelly, Springfield, Va., assignor to Melpar, Inc., Falls Church, Va., a corporation of Delaware
Filed Aug. 30, 1965, Ser. No. 483,608
16 Claims. (Cl. 340—172.5)

ABSTRACT OF THE DISCLOSURE

A statistical switch for variably controlling the probability that a completed circuit will be provided between a single input channel and any one of a plurality of output channels, in which input signal is fed to the single input channel for application in parallel to a plurality of gating circuits each connected to a distinct and different one of the output channels. Each of the gating circuits is energized in sequence to pass input signal therethrough, and the entire energizing sequence repeated during a substantially constant period of time. The probability of obtaining an output signal at a particular output channel at any given instant during this period is increased by increasing the time interval over which the gating circuit connected to that channel is energized, as compared with the time intervals over which the other gates are energized, such that the probability of obtaining an output signal from the switch remains at unity although the likelihood that it will appear at a specific output channel may be controllably varied.

---

The present invention relates generally to machine intelligence systems of the type which are self-organizing to respond in a desired manner to various external stimuli, such systems being generally referred to as learning networks or trainable networks whose behavioral patterns are self-adjusted in accordance with internally generated training signals indicative of "good" or "bad" reactions of the network to the stimuli. More particularly, the present invention relates to statistical switches for use in such systems and networks and which are capable of assuming any one of a plurality of separate and distinct states or levels in reaction to training signals applied thereto so that a desired response to the external stimuli is manifested.

In a typical system, the learning network or trainable network comprises a plurality of statistical decision elements which respond, for example, to signals representative of physical conditions such as the reaction of a control element to its local environment, applied as inputs to the network via a suitable sensing transducer, and as well to training signals which are indicative of whether or not the network is making decisions or tending toward making decisions in accordance with a desired objective. The determination of whether a proper decision is being made or whether the network is tending to make the proper decision is usually accomplished by reference to the manner in which a controlled element, usually termed a "plant," responds to the output of the trainable network.

The training signals are customarily characterized as being of either a reward or punishment nature indicative, respectively, of an improvement in performance or of a degradation of performance in the network's decision-making reaction to its inputs, relative to the immediately past performance. These training signals are generated by a goal circuit whose function is to organize the network toward a specific objective. To this end, the goal circuit is provided with a set of specific criteria which may be either of a static or of a dynamic nature, that is fixed or subject to change, depending upon the particular system requirements, as a means of evaluating the network performance. Each decision element may include a switch which is operative to perform in a desired manner such as to provide a connective between the multiple inputs and outputs of the network, on a statistical basis. Hence, such switches are generally termed statistical switches.

It is frequently desired to provide a trainable network which can form a number of input-output Boolean logical functions such that it becomes capable of self-organization to any general connective of M input-N output variables. Trainable networks of this general type have been devised in the prior art using bi-level statistical switch elements. For example, in the copending applications of Robert J. Lee, Ser. No. 160,965, filed Sept. 14, 1961, and entitled "Self-Synthesizing Machine," and of Peter H. Halpern, Ser. No. 170,059, filed Jan. 31, 1962, and entitled "Generalized Self-Synthesizer," there are disclosed systems capable of self-synthesizing Boolean logical functions of two or more binary input variables. The bi-level statistical switches therein employed may be used separately or in interconnected groups to form the desired Boolean connectives in accordance with the immediate reinforcement provided by the training signals from a goal circuit. Minterms in the form of canonical products of the plurality of inputs to the network are provided by a suitable minterm generator to which the input variables are applied. Thus, for example, in a system having two inputs, A and B, where A and B are binary digits (bits) having either zero or non-zero values representative of externally derived information, the minterm generator or generators of the network may derive the canonical products, AB, $\overline{A}$B, $\overline{AB}$ and $\overline{AB}$, where the bar over a symbol represents the customary notation "not," i.e., $\overline{A}$ is "not A" so that if A is 1, $\overline{A}$ is "not one," or zero. Obviously, for the general case of M input variables of a binary type, a maximum of $2^M$ distinct and different input minterms may be generated. In the past, since the statistical switches have been of the bi-level type, the trainable logical network requires one switch per minterm per output variable. For an M input-N output system, this means a total of $N2^M$ statistical switches. In the bi-level switch arrangements, the training signals are effective to either bias each switch or not, for example, to open or to close a switch; hence, as the number of network input variables, and/or output variables increases or the function to be derived by the network becomes more complex, the complexity of the network increases proportionally both as to number and interconnection of the switches.

Accordingly, it is a primary object of the present invention to provide a new and improved statistical switch for use in trainable or adaptive networks.

In the prior art when the system is initially "learning" the particular logical function to be synthesized, each statistical switch has equal probabilities of passing or blocking the canonical products having values of binary 1, for example. If the switch passes or blocks the binary 1 canonical product, as may be desired for a particular synthesis, that state of the switch is rewarded. Rewarding a switch, in the form of providing a proper training or reinforcement signal, has the effect of increasing the probability that the switch so rewarded will respond in the same manner when it is next presented with the same input and the same output is desired. A training signal of the opposite type, that is a punishment signal, is generated by the goal circuit if the statistical switch responds to synthesize or organize itself to a logical function that is contrary to the desired function. Typically, each switch is adapted to retain its ability to respond in a manner contrary to its previously applied training signal when subsequently called upon to make the same decision in the same decision interval, i.e., the interval of time over which a switch is requested to respond to a particular input variable or a set of input variables, unless and until the input variables and the function derived therefrom are repetitive over a considerable number of decision intervals. At that time the switch arrives at a substantially non-statistical or deterministic limit.

The time required to train prior art statistical switches of the bi-level type may be and generally is quite extensive. For example, in the apparatus disclosed in the above-mentioned applications, erroneous results may occur for an extended period of time before the system organizes to the desired Boolean function. In the apparatus disclosed in the Lee application several statistical switches are cascaded together to provide outputs related to more than one input variable. As previously mentioned, such complexity is undesirable. Moreover, the probability of initially deriving all of the desired responses is precluded since certain responses are initially inhibited. The apparatus disclosed by the Halpern application represents an advance in effecting a more rapid organization since Halpern employs plural generalized minterm generators with each of the minterm generators being responsive to all of the input variables. A major disadvantage, however, resides in the fact that only one switch is trainable at a time.

Briefly, in accordance with the present invention there is provided a multi-level statistical switch, primarily for use in trainable logical networks, although not limited thereto, which is capable of providing an output at any one of a plurality of output channels or terminals. By appropriately connecting the several output channels of each switch to various combining networks including, for example, AND gates, OR gates, and other logical gates, it is possible to provide a large number of Boolean logical combinations in the form of output combinations deriving from the network. Thereby, the number of statistical switches which may be required in a particular trainable logical network is significantly reduced over the number which would be required if bi-level switch elements were employed. For example, as previously stated, a bi-level switch system requires one switch per minterm per output variable; that is, M inputs will provide $2^M$ minterms and the total number of switches required for N outputs is $N2^M$, whereas the multi-level statistical switch contemplated by the present invention requires only one switch per minterm, that is $2^M$ switches having a plurality of levels, one for each output combination. Thus, the $2^M$ switches each provide $2^N$ levels.

In a preferred embodiment of the multi-level statistical switch according to the present invention there is provided a shift register having a plurality of stages through which a single binary "1," for example, is recirculated. Each register stage is coupled to a separate gate circuit to enable the latter to pass the input minterm, applied in parallel to each of the gate circuits, to a respective switch output terminal, to which the gate is also connected, as the binary 1 shifts from stage to stage of the shift register. With no biasing of the time interval between successive shift pulses applied to the shift register, the several stages of the register are each activated for an equal interval of time as the activating bit (binary "1" in this example) successively shifts from one stage to the next. Hence, each output combination is provided with equal probability, in the sense that each output channel is energized for an equal period of time, and the probability of obtaining at least one of the output minterms from the multi-level switch is unity. To provide the output minterm which, in conjunction and combination with output minterms derived from desired channels of the other statistical switches of the trainable network, produces the desired output combination from the network, at a particular output channel of the switch for a greater period of time than at other of the switch output channels, the frequency at which shift signals are generated and applied to the shift register is biased in accordance with the generation of training signals by the goal circuit. That is, if the switch makes the proper decision, as indicated by the formation of the desired output combination or function at the output terminals of the network, the state which the switch has assumed to do so is rewarded and the reward signal is employed to bias the length of the interval during which the proper stage of the shift register for that particular decision is activated. Similarly, the receipt of a punishment signal from a goal circuit effects a change in the time between generation of consecutive shift signals so that the intervals during which undesirable output combinations are provided are decreased. In this manner, as the probability of obtaining one output combination is increased the probability of obtaining the others is decreased such that the probability of obtaining at least one of the output combinations remains at unity. Thus, the multi-level statistical switch provides selective training of an M input=N output network configuration.

When the goal circuit is reliable the maximum number of training trials required by the multi-level switch to provide and maintain the desired output combination is $K-1$ where K is the number of levels which the switch may attain. It is desirable that the period of the shift register loop, that is, the time required for the bit (binary 1) to make one complete cycle through the register, be small compared to the decision interval employed. Systems in which multi-level statistical switches of the type contemplated by the present invention are used may be trained to provide certain statistical outputs as well as to provide logical outputs.

It is therefore another object of the present invention to provide a multi-level statistical switch for use in trainable or adaptive networks.

It is another object of the invention to provide a statistical switch which is capable of more rapid training to provide a desired response than are prior art statistical switches.

Another object of the present invention is to provide a multi-level statistical decision element which is responsive to training signals to provide the desired logical output within a fewer number of training trials than have been necessary for prior art decision elements.

It is a still further object of the present invention to provide a statistical decision element having a plurality of output channels each of which is capable of being energized and wherein the probability that any particular output channel will be energized is increased or decreased in accordance with the desirability or undesirability of the immediately preceding decision element performance.

Another object of the invention is to provide a multi-output statistical switch having the capability of sequentially energizing all of its outputs over a relatively constant period of time while varying the intervals of time during which particular individual outputs are energized.

The above and still further objects, features and attendant advantages of the present invention will become apparent upon consideration of the following detailed description of one specific embodiment thereof especially when taken in conjunction with the accompanying drawings in which:

FIGURE 3 illustrates one embodiment of a multi-level statistical switch which may be employed in the network of FIGURE 2;

FIGURE 5 illustrates in block diagrammatic form a portion of a counter and an analog bias unit suitable for use in the statistical switch of FIGURE 3.

Figure 1:
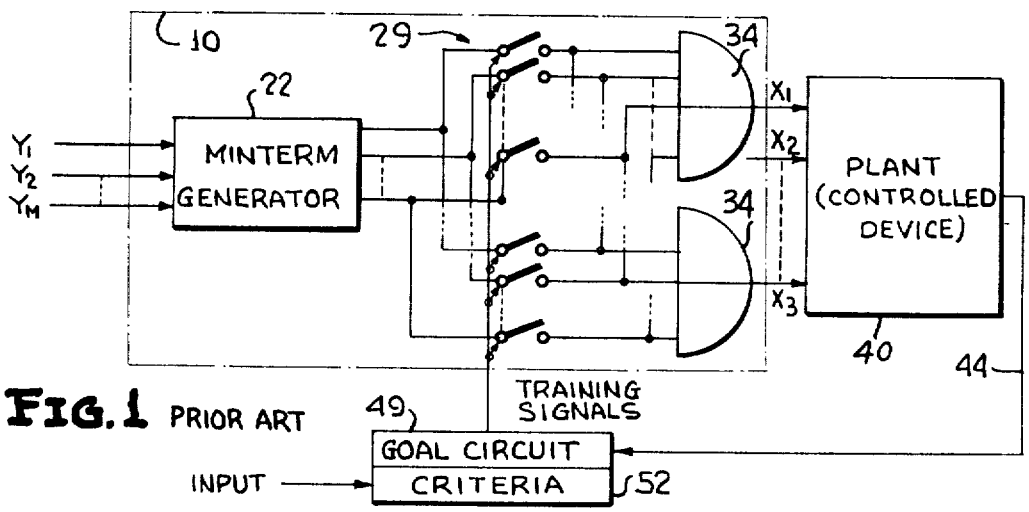
FIGURE 1 shows in block diagrammatic form a trainable logical network of the prior art type wherein bi-level statistical switches are employed.

Referring now to FIGURE 1, a trainable logical network of the prior art type as illustrated by the above-mentioned copending Halpern application comprises a minterm generator 22 to which are applied a plurality of input variables $Y_1, Y_2, \ldots Y_M$ to network 10. Minterm generator 22, which may include, for example, a plurality of inversion networks coupled to a plurality of AND gates, forms the canonical products of the inputs bits $Y_1, Y_2 \ldots Y_M$ and their inversions or negations $\overline{Y}_1, \overline{Y}_2, \ldots \overline{Y}_M$, so that $2^M$ non-redundant canonical products or minterms are supplied, one at each of its $2^M$ output terminals. Each minterm is applied to a statistical switch in each of a plurality of groups 29 of statistical switches, the number of groups depending upon the number of outputs desired to synthesize a particular function.

Since each minterm derived from generator 22 is applied to a separate statistical switch in each group 29 of the switches, it is apparent that each group 29 contains $2^M$ statistical switches. Moreover, if logical network 10 provides N output signals $X_1, X_2 \ldots X_N$, then N groups 29 of statistical switches are required for the network 10. The total number of statistical switches required for a trainable logical network 10 of the prior art type, then, is $N2^M$, assuming that each statistical switch is of the previouslym entioned bi-level type. The switches function to provide connectives between input and output of network 10 via, for example, a separate OR gate 34 for each group of switches. In a typical arrangement, the plurality of output signals $X_1, X_2, \ldots X_N$, in the form of one or more Boolean logical functions are applied to a controlled device (commonly termed a plant) 40, the latter device being controlled in accordance with the signals applied thereto. Alternatively, the output signals from trainable logical network 10 may be applied to any receiving station wherein the results of the synthesis performed by the network may be read out, for example, on a plurality of teletypewriters. These results, whether simply through readout or through a sensing of the response of a controlled device, are suppliesd via a line 44 to a goal circuit 49. The function of goal circuit 49 is to organize network 10 toward some specific objective and, to this end it is generally operative to compare the results of the synthesis with certain criteria supplied in suitable form from a device 52. The latter may comprise a memory unit whose cells contain certain fixed data or may be subject to continuous application of new signals with erasuree of old data in accordance with the changes in the input data or input variables to network 10. During any particular decision interval; that is, the particular time interval during which input variables to network 10 are not subject to change, network 10 is operative to organize itself toward the formation of a Boolean logical function output. Goal circuit 49 provides training signals which are indicative of how well the network is performing its function and which are further operative to organize the network toward the specific desired object. Thus, if the output of network 10 is other than that which is desired, as manifested by an improper response, for example, of plant 40 to its control signals (the output combination or combination from network 10), goal circuit 49 supplies one or more punishment signals along conductive paths to the various groups of statistical switches. On the other hand, if network 10 provides the desired output function by virtue of statistical is operative to generate a reward signal which provides switches forming the desired connectives, goal circuit 49 an immediate reinforcement to the behavioral pattern (i.e., operation) of the switches.

Because of the complexity of the logical network 10, as indicated by the number of statistical switches required where a large number of network inputs and outputs are necessary, it may take a considerable length of time to train the network to synthesize the desired Boolean logical output function. Moreover, the complexity, and hence the cost of such a network may be prohibitive where a large number of inputs and outputs are required.

Figure 2:
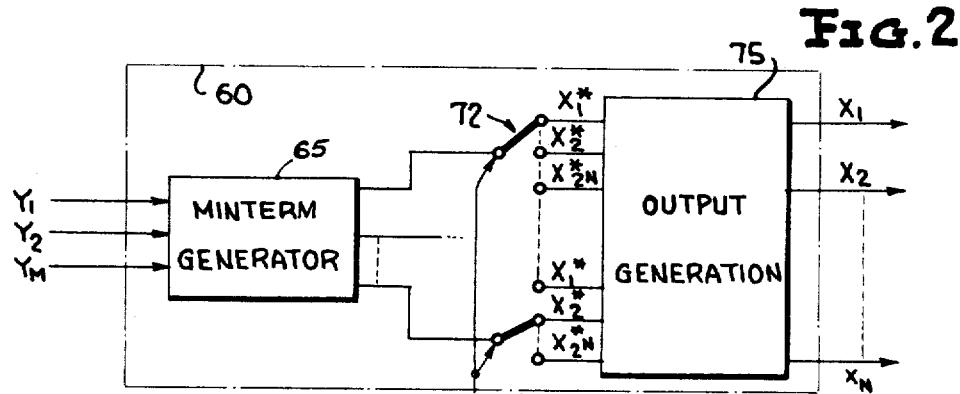
FIGURE 2 illustrates in diagrammatic form a portion of the trainable logical network employing multi-level statistical switches in accordance with the present invention.

Referring now to FIGURE 2, there is illustrated in partially schematic and partially block diagrammatic form a trainable logical network 60 of the type contemplated by the present invention wherein are employed multi-level statistical switches. Again, the plurality of input variables $Y_1, Y_2 \ldots Y_M$ supplied to network 60 are fed to minterm generator 65 which is operative to form the desired nonredundant canonical products of the input variables. Here, however, each canonical product is applied to only one of a plurality of statistical switches 72. Each switch is provided with a plurality of output channels or terminals through which a connective between input and output of network 60 may be provided. If the network is adapted to provide N output variables $X_1, X_2 \ldots X_N$, then each statistical switch is provided wih $2^N$ output channels so that it is capable of providing any one output of the plurality of outputs $X_1^*, X_2^* \ldots X_2^*_N$. Each of the output channels is connected to an output generation device 75 which may comprise a plurality of logical gates, for example, interconnected in any desired manner, from which the N output combinations of network 60 are derived. Again, reward and punishment signals are generated by a goal circuit and applied to the various multi-level statistical switches depending respectively upon whether or not the switches are providing the desired connectives, as indicated by the particular combination or function synthesized.

An exemplary embodiment of a multi-level switch in accordance with the present invention is shown in FIGURE 3. The input minterm to statistical switch 72 is applied in parallel via conductive path 101 to a plurality of gate circuits 104 corresponding in number to the number of output channels or connectives which it is desired that the switch be capable of providing. In the embodiment shown, the trainable logical network of which switch 72 is a part provides, for example, two output combinations, switch 72 thereby being required to provide combinations, switch 72 thereby being required to provide four output connectives $X_1^*, X_2^*, X_3^*$ and $X_4^*$, and one statistical switch being provided for each minterm supplied by minterm generator 65 (FIGURE 2). The output variables generated by the logical network will depend upon the particular manner in which the output channels of the several statistical switches of the network are interconnected or gated through output generation unit 75. It is to be emphasized at this time that the particular switch embodiment shown in FIGURE 3 is purely exemplary and that the number of output channels which a multi-level switch in accordance with the present invention is capable of providing will depend solely on the number of output variables required to be generated by the trainable logical network.

A shift register 107 is provided having a number of stages equal to the number of output channels of the switch, each register stage being connected to a respective one of gates 104, so that each gate is opened or closed depending respectively upon the contents of its particular associated register stage. Shift register 107 is arranged to recirculate or recycle its contents so that as the contents of each stage shifts to the next succeeding stage upon application of a shift pulse to the register, the contents of the last stage, 116 in this case, are supplied back to the first stage 110. To this extent shift register 107 is of a completely conventional and well-known type. The shift register is arranged to contain a single recirculating bit representative of a binary "1" so that only one stage can contain a binary "1" at any given instant of time, each of the other stages containing, at that particular instant, a binary zero. When a shift pulse is supplied to register 107 from level sensor 167, the binary 1 shifts from one stage of the register to the next succeeding stage. In the illustrated embodiment, stage 112 contains a binary 1 and stages 110 and 114 and 116 contain binary zeros whereas at the next succeeding shift pulse applied by level sensor 167 the binary 1 will shift to stage 114, and so forth.

If the shift pulses are equally spaced, in time, then each stage of the shift register will contain the recirculating binary 1 for an equal interval of time during a complete recirculation period of register 107, i.e., the period during which the binary 1 is cycled from stage 110 through stages 112, 114, 116 and back to stage 110.

To control the length of time between the generation of shift pulses and hence, the interval during which any particular register stage contains a binary 1, level sensor 167 is arranged to respond to the output of a noise generator 164 and of an analog bias unit 160. Since the noise emanating from generator 164 has a completely random level the output of analog bias unit 160 may be set at a level such that, on a statistical basis, there is equal probability that the noise level will be either above or below the bias level. This bias level will hereinafter be termed the median level. Thus, if the analog signal emanating from bias unit 160 is at the median level there is a high probability that shift pulses, generated by level sensor 167 when the noise level exceeds the median level, will be equally spaced in time, and therefore that each shift register stage will be activated, i.e., contain the binary 1, for an equal interval of time. Accordingly, each output $X_1^*$, $X_2^*$, $X_3^*$, $X_4^*$ will occur with equal probability, that is, for an equal period of time, since each gate 104 is enabled to pass the input minterm to its respective output channel by the presence of a binary 1 in its associated shift register stage.

In the above-described sequence of events and referring to the illustrated embodiment of FIGURE 3, shift register stage 112 contains the binary 1 and supplies an enabling voltage, for example, to its associated gate 104 to permit the passage of the input minterm to the output channel designated by output $X_2^*$. When the next successive shift pulse is generated by sensor 167, the binary 1 will shift from stage 112 to stage 114, energizing the gate associated with the latter to provide output $X_3^*$. If the analog signal generated by bias unit 160 remains at the median level each register stage is activated for an interval equal to one quarter of the total cycling period of the shift register. However, by exercising some control over the level of the analog signal from bias unit 160, it is possible to increase or decrease the interval during which any particular register stage contains the recirculating bit and hence to control the time interval during which a particular one of the plurality of output channels is energized. For example, if the desired response of the network is manifested when an output minterm is derived from the channel corresponding to combination $X_2^*$, a reward signal will be generated by the goal circuit during that interval and that reward signal may be used to considerably increase the time during which register stage 112 is activated in comparison with the time intervals during which each of the other stages is activated. This constitutes one requirement of training of the network; that is, as the probability of obtaining one output combination from any particular statistical switch is increased, the probably of obtaining the others must be decreased so that the probability of obtaining at least one of the output combinations remains at unity. It is also desirable that an average period of recirculation of the bit in shift register 116 be constant, although this is not necessary and, in any event, that the period of recirculation be small compared to the decision interval.

There are several possible arrangements by which to implement the desired control over the level of the analog bias unit 160. One arrangement, by way of example, is indicated in FIGURE 3, where a separate counter is associated with each of the several stages of the shift register. Each counter 130, 132, 134 and 136 may be of the conventional forward-backward or reversible type such that the simultaneous application of a bit, indicating the associated register stage is activated, and of a reward signal, indicating that the desired Boolean logical function has been synthesized by the network, to a particular one of the counters will cause that counter to count up, while the lack of activation of their associated register stages coupled with the receipt of a reward signal will cause the other counters to count down, or vice versa. Similarly, a punishment signal may be arranged to have the latter effect; that is, to cause a counting down of the counters to which it is applied. The count of each counter may then be employed in succession to vary the level of the signal developed by the analog bias unit 160, upwardly as the count decreases and downwardly as the count increases (or proportionally to the count, if desired). In this manner the noise level generated by noise generator 164 is less likely to exceed the bias level during a low count (high bias level) interval than would be the case if a lower bias level were generated by analog bias unit 160, so that the output combination which effects the generation of a reward signal is maintained over a longer interval than are the other output combinations. In other words, the probability of obtaining the desired output combination is increased.

Another, and more simple, arrangement for exercising control over the level of the analog bias signal is to provide a single counter 125 (FIGURE 3) having a separate counter stage associated respectively with each separate shift register stage and wherein each counter stage comprises a flip-flop. One technique of implementing the latter method is illustrated in FIGURE 5, only two of the four counter stages being shown since each counter stage is identical to the others. Referring now to FIGURE 5, each counter stage may comprise a flip-flop 174 having a pair of input terminals and an output terminal, an inhibitor circuit 176, an OR gate 178, and three AND gates 180, 182 and 184. Each of the three AND gates has as one of its two inputs a connection via conductive lead 196 to the shift register stage respectively associated with their counter stage. The other input terminal of each of AND gates 180 and 182 is connected to the reward signal output terminal of goal circuit 140 (FIGURE 3). The second input terminal of AND gate 184 is connected to the punish signal output terminal of goal circuit 140. The output terminal of AND gate 180 is connected to one input terminal of flip-flop 174, the other input terminal of the latter being connected to the output terminal of OR gate 178. The output terminal of AND gate 182 of each counter stage is connected to one input terminal of OR gate 178 of each of the other counter stages. Thus, for example, the output terminal of AND gate 182 of counter stage 130 is connected to an input terminal of OR gates 178 of each of the counter stages 132, 134, 136. The output terminal of AND gate 184 is connected in parallel to one input terminal of OR gate 178 and to the inhibit terminal of inhibitor circuit 176.

Figure 4:
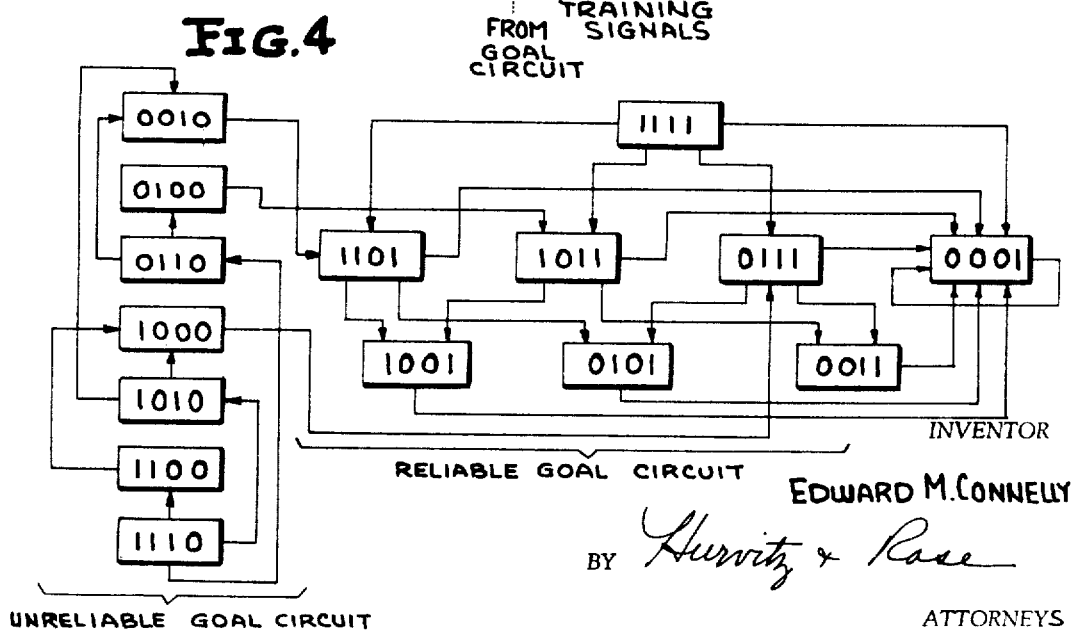
FIGURE 4 is a symbolic form of transition matrix for a counter which may be employed in the statistical switch of FIGURE 3.

In operation of the circuit of FIGURE 5, a clear pulse may be provided via conductive line 177 to reset each flip-flop 174 to a "one" state at the beginning of each decision interval. FIGURE 4 represents symbolically the transition matrix for counter 125, i.e., the likelihood of transition from one state to another under the control of reward and punishment signals from the goal circuit, where the desired state of counter 125 is 0001, corresponding to output $X_4^*$. Since the counter stages are initially reset by the clear pulse to contain a 1, counter 125 is initially at its maximum count, and the desired output from the multi-level switch in this example occurs when the counter reaches its minimum count. If, at the beginning of the decision interval, the bit circulating through the shift register 107 is at the position indicated in FIGURE 3, i.e., a binary 1 contained in shift register stage 112, then the output minterm to the multilevel switch 72 is passed via associated gate 104 as output $X_2^*$. Since this will not effect the synthesis of the desired Boolean logical function (which occurs, in this example, only with output $X_4^*$) by the trainable logical network, a punishment signal is generated by goal circuit 140 and applied via conductive lead 194 to AND gate 184 of each of the counter stages of the statistical switch. The presence of the punishment signal, in the form of a binary 1, in conjunction with the binary 1 output on conductive lead 196 of the counter stage 132, resulting from the occupation of the recirculating bit within register stage 112, results in the application of a pulse via OR gate 178 to the opposite terminal of flip-flop 174, whereby that flip-flop assumes a zero state. Thus, the transition state of the counter at this time is 1011, the output of each counter stage is applied to summing amplifier 216 of analog bias unit 160.

The median level of the analog signal deriving from the bias unit is arranged to occur when each of the counter stages is at a binary one state, i.e., 1111. The reduction in the count of counter 125 to 1011 at this point (FIGURE 4) results in a reduction in the output level of summing amplifier 216, and hence in the level of analog signal applied to level sensor 167. Thus, the probability that the noise level sensed by sensor 167 will exceed the analog signal level is enhanced and the sensor generates a shift pulse more rapidly, on a statistical basis, than would otherwise be the case. The binary 1 is thereby shifted from register stage 112 to register stage 114 to permit passage of the input minterm as output $X_3^*$. Again, this does not result in the desired Boolean logical function and a punishment signal is therefore generated by goal circuit 140. The simultaneous application of binary 1's to the two inputs of AND gate 184 of counter stage 134 triggers its flip-flop to a zero state, further reducing the count applied to summing amplifier 216 and, in turn, the analog bias level. It is apparent, of course, that no other counter stage is effected because of the presence of a "0" in each of the other register stages. The counter transition state is now 1001 (FIGURE 4), each flip-flop of counter stages 130 and 136 being in the one state and each flip-flop 174 of stages 132 and 134 being in the zero state. The resulting reduction in analog bias signal level effects a still more rapid generation of a shift pulse from sensor 167 and the binary 1 is shifted from register stage 114 to stage 116.

At this point, gate 104 associated with stage 116 is energized to pass the input minterm of switch 72 as output $X_4^*$, all the remaining gates 104 of that switch, of course, being closed since none of the other shift register stages contains a binary 1. The generation of output combination $X_4^*$ from statistical switch 72 results in a synthesis of the desired logical function and a reward signal is simultaneously generated by goal circuit 140. The presence of a reward signal, in the form of a binary 1, on lead 192 and the concurrent presence of a binary 1 on lead 196 from the associated shift register stage produces an output from AND gates 180 and 182; the former being applied to flip-flop 174 which, since it is already in the one state, is maintained therein; and the latter applied to each of OR gates 178 of the other three counter stages and thereby to the punish terminals of their respective flip-flops 174, whereby any of those flip-flops which are not already in the zero state are set to the zero state. In this case, only counter stage 130, of the three stages which are affected by the signal emanating from gate 182 of counter stage 136, is driven from the one to the zero stage, the other two stages having and retaining a "0" count. Hence, the state of the counter is 0011, as desired.

In order to increase rather than decrease the analog bias level applied to level sensor 167 when the counter is in the 0001 state, it is necessary to invert that signal. The median level of the bias signal emanating from analog bias unit 160 may be considered a reference or datum level below which the analog bias signal is negative and above which the bias signal is positive (relative to that datum). Hence by inverting the bias signal when a reward signal is generated by goal circuit 140, the bias level is increased above the median level and the probability that the noise level will exceed this bias level is reduced. To this end, the reward signal is also applied to analog bias unit 160 which may, for example, comprise D/A conversion apparatus including conventional summing amplifier 216 (with appropriate weighting resistors coupled to the flip-flop of each counter stage), inverting amplifier 213 and gate 217 in amplifier output path 225 and inhibitor circuit 220 in amplifier output path 228. Initially, or when the switch is punished, the output of amplifier 216 is applied via path 228 through gate or switch 220, which, absent a reward signal, permits passage of the bias signal to an energy storage device, such as a capacitor. The noise level is compared with the capacitor voltage and a shift pulse generated by sensor 167 when the former exceeds the latter. If the capacitor is coupled always to the median voltage level (as a reference or datum level) then a negative voltage, relative to that level will be used for purposes of comparison when less than all counter stages are in the "1" state. The generation of a reward signal, however, will result in the passage of summing amplifier output through path 225. Inverting amplifier 213 may be adjusted to increase the signal level well above the median level in a positive direction, so that the probability that a shift pulse will be generated by sensor 167 is decreased.

It will be observed that the maximum number of training trials required to train the statistical switch, and hence the entire trainable logical network, is $K-1$ where $K$ is equal to the number of outputs from which a signal may be passed by a particular statistical switch. In this case, the number of output channels is 4 and hence the maximum number of training trials required is 3; provided, however, that the goal circuit is reliable. It may, however, happen that the goal circuit is not reliable in which case either the counter transition states at the right of FIGURE 4 will be assumed by the counter, all of which will revert after relatively few transitions to the desired state, or that each flip-flop 174 will be set at the zero state, so that the count of the counter is 0000.

To prevent this latter occurrence, and to effect more rapid retraining, there is provided an inverter circuit 250 (FIGURE 5) connected to the output of the respective flip-flop of each counter stage and the output of which is applied to one of the four inputs of an AND gate 254. Hence, if all four flip-flops should concurrently assume the zero state the output of each inverter circuit will be a binary 1 which results in an output from AND gate 254. The AND gate output terminal is connected to the input terminal of each inhibitor circuit 176 so that, if no inhibiting input is applied from associated AND gate 184, the respective flip-flop is reset to the "1" state. Thus, if three of the four flip-flops 174 are set at "0," and the last flip-flop assumes the zero state as the result of the simultaneous presence of a "1" in its associated register stage and a punishment signal (applied to AND gate 184), that flip-flop will not be reset to "1" along with the others, by virtue of the operation of its associated inhibitor circuit 176. Complete retraining of the switch is therefore not required upon such an unlikely, although possible, occurrence.

It will readily be appreciated that the provision of a multi-level statistical switch provides selective training for a logical network having an M input-N output configuration. In addition, if the goal circuit is reliable, the mean training values of the statistical switch can be calculated from the lefthand position of the transition matrix presentation in FIGURE 4. In any event, the mean training values are lower than those obtainable with a bi-level switch system.

While I have illustrated and described one specific embodiment of my invention, it will be apparent to those skilled in the art that various changes and modifications in the specific details of construction may be resorted to

I claim:

1. A multi-level statistical switch for use in a trainable logical network of the type in which logical functions are formed at a plurality N of network output terminals as combinations of binary signals developed from a plurality M of input variables applied to the network, and wherein is provided a goal circuit for sensing the presence or absence of a desired logical function at the N output terminals of the network and for generating training signals indicative respectively of a reward or punishment of the network in response thereto, said switch comprising a plurality $2^N$ of output channels, a plurality of signal gating means each coupled to a respective one of said output channels, means for applying one of said binary signals in parallel to said plurality of signal gating means, and means responsible to said training signals for controlling the energization of each of said plurality of signal gating means and thereby the probability that an output signal will be derived from a particular one of said output channels, whereby said switch is trainable to provide an output signal at a channel appropriately interconnected with channels of other similarly trainable switches to form the desired logical function at said network output terminals.

2. The combination according to claim 1 wherein said means for controlling includes means for energizing said plurality of signal gating means in cyclic sequence for sequentially deriving output signal from each of said output channels, and means for regulating the time interval during which each of said signal gating means is energized, whereby the interval during which an output signal will be derived from any one of said channels during a period of cyclic sequencing of said gating means may be increased or decreased for training said network to form the desired logical function.

3. The combination according to claim 2 wherein said means for regulating includes means for maintaining the average period of said cyclic sequencing constant.

4. The combination according to claim 2 wherein said means for energizing includes shift register means having a plurality of stages arranged in a loop for recirculation of the contents thereof in response to time separated shift pulses, each shift pulse effecting a transfer of the contents of each stage to the next succeeding stage and the contents of the last stage back to the first stage, each of said stages being connected to a separate respective one of said signal gating means, the contents of said shift register means being capable of activating only one stage at any given instat of time, whereby to energize said signal gating means one at a time in sequence for passage of the applied combinations of binary signals therethrough as the respective stages of said shift register means are sequentially activated.

5. The combination according to claim 4 wherein said means for regulating includes a source of electrical noise, a bias signal generator, means for varying the output level of said bias signal generator in response to said training signals, and means for generating said shift pulses at time separations governed by a comparison of the relative levels of said noise and of said bias signal.

6. The combination according to claim 3 wherein said means for regulating includes a plurality of electronic counter means each associated with a respective one of said signal gating means and each including means for sensing the concurrent energization of the associated signal gating means and the application of a training signal to said switch to attain a count either greater than or less than its immediately preceding count depending respectively upon whether said last-named training signal is indicative of a reward or a punishment, said attained count effecting the regulation of the time interval during which the energized signal gating means remains in its energized condition.

7. In an adaptive network having means for generating N digital output signal combinations and capable of being organized by training signals to generate desired ones of said output combinations in response to parallel application thereto of M digital input signals, apparatus for deriving a plurality of combinations of said input signals, including a plurality of multilevel statistical switches each arranged to receive a respective one of said input signal combinations; each of said switches comprising a plurality of output circuits, means for conductively transferring the input signal combination to which a switch is responsive to any one of said output circuits, and means for driving said transferring means to sequentially provide a separate signal path for said input signal combination to each of said output circuits, said driving means including biasing means responsive to said training signals to control the time interval during which each separate signal path is provided; and means coupled to said output circuits of each switch for forming said N output combinations each in accordance with the particular output circuit at which an input combination is present, whereby the derivation of an output signal from a particular output circuit of any switch affects the output combination generated by said network.

8. A switching circuit having an input terminal and a plurality of output terminals, means for cyclically and sequentially completing a conductive path between said input terminal and each of said output terminals, and means for selectively varying the length of the respective time interval over which each of said paths is completed to accordingly vary the duration of appearance of signal applied to said input terminal at any one of said output terminals.

9. The invention according to claim 8 wherein said time interval varying means includes a threshold detector, means for selectively varying the threshold level of said detector, a source of noise voltage, and means applying said noise voltage to said threshold detector for generation therefrom of a path completion command over the interval between successive excursions of said noise voltage above the selected threshold level.

10. The invention according to claim 8 wherein said time interval varying means comprises means for generating a statistically random signal level, means for establishing a variable threshold level, and means for comparing the relative values of said random signal level and said threshold level as a criterion for determination of the length of each time interval.

11. The invention according to claim 8 wherein said path completing means includes a plurality of gate circuits each coupled to a distinct and different one of said plurality of output terminals, means connecting said input terminal in parallel to each of said gate circuits, and means for energizing said gate circuits one at a time to successively conductively connect said input terminal to each of said output terminals.

12. The invention according to claim 11 wherein said means for energizing comprises a binary recirculating shift register having a plurality of stages each coupled to a distinct and different one of said gate circuits, and means for applying shift pulses to said register; and wherein said time interval varying means comprises means for varying the frequency at which said shift pulses are applied to said register.

13. The invention according to claim 12 wherein said frequency varying means comprises a source of noise voltage, means for establishing a variable threshold level, and means for regulating the generation of said shift pulses according to the relative amplitudes of said noise voltage and said threshold level.

14. In a self-organizing network for controlling the operation of a device in accordance with control signals applied to said device by said network, the combination comprising a plurality of function generating means for developing control signals in response to application of input signal thereto; a plurality of switching circuits, each having an input terminal and a plurality of output terminals, means connecting said output terminals to said function generating means in predetermined array, means for cyclically and sequentially completing a conductive path between said input terminal and each of said output terminals, and means responsive to the operation of said device for selectively varying the length of the respective time interval over which each of said conductive paths is completed to bias said completion of paths in favor of application of signal from each said input terminal to those of said plurality of function generating means developing control signals tending to produce the desired repsonse by said device.

15. A switching circuit having an input terminal and a plurality of output terminals, means for cyclically and sequentially completing a signal path between said input terminal and each of said output terminals, and means for selectively varying the length of the respective time interval over which each of said paths is completed accordingly vary the duration of appearance of signal applied to said input terminal at any one of said output terminals.

16. In a self-organizing network for controlling the operation of a device in accordance with control signals applied to said device by said network, the combination comprising a plurality of function generating means for developing control signals in response to application of input signal thereto; a plurality of switching circuits, each having an input terminal and a plurality of output terminals, means connecting said output terminals to said function generating means in predetermined array, means for cyclically and sequentially completing a signal path between said input terminal and each of said output terminals, and means responsive to the operation of said device for selectively varying the length of the respective time interval over which each of said signal paths is completed to bias said completion of paths in favor of application of signal from each said input terminal to those of said plurality of function generating means developing control signals tending to produce the desired response by said device.

References Cited
UNITED STATES PATENTS

| | | | |
|---|---|---|---|
| 3,262,101 | 7/1966 | Halpern | 340—172.5 |
| 3,319,229 | 5/1967 | Fuhr et al. | 340—172.5 |
| 3,327,291 | 6/1967 | Lee | 340—172.5 |

PAUL J. HENON, *Primary Examiner.*

R. B. ZACHE, *Assistant Examiner.*